April 1, 1952  G. L. BENNETT  2,591,395
MAGNETIC TORQUE DEVICE
Filed Aug. 20, 1949
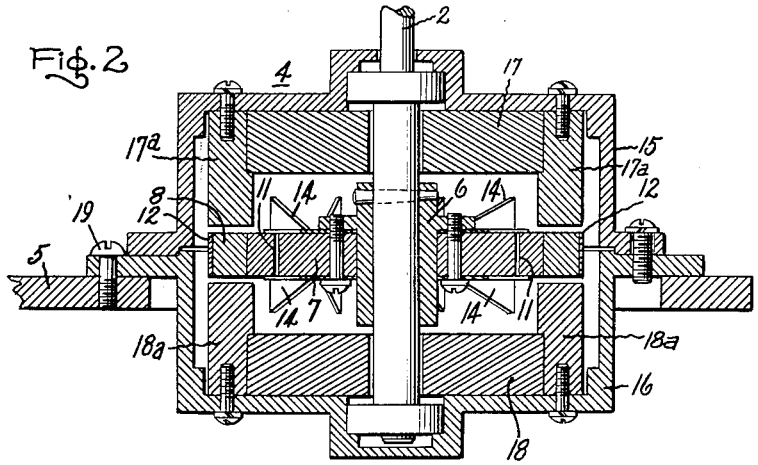
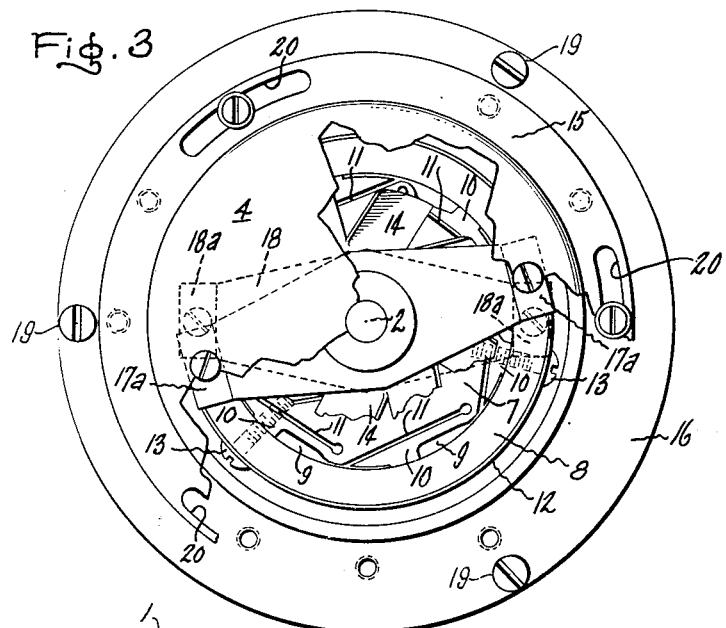
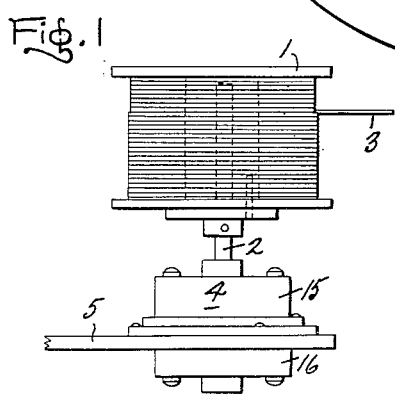
Inventor:
Gardell L. Bennett,
by Claude H. Mott
His Attorney Patented Apr. 1, 1952

2,591,395

UNITED STATES PATENT OFFICE 2,591,395

MAGNETIC TORQUE DEVICE

Gardell L. Bennett, Schenectady, N. Y., assignor to General Electric Company, a corporation of New York Application August 20, 1949, Serial No. 111,497

1 Claim. (Cl. 172—284)

My invention relates to magnetic torque devices, and more particularly to magnetic drag devices of the hysteresis or eddy current torque type useful as clutching or braking elements.

My invention is particularly applicable to braking or tensioning devices for spindles, reels or pulleys used in the textile industry or other winding and reeling applications. Devices embodying my invention may be used to apply braking torque to a spindle, reel or pulley, and thus to maintain tension on an elongated filament, such as a thread, or the like.

Hysteresis torque devices characteristically develop a substantially constant torque and are thus particularly useful as braking or tensioning devices in winding and reeling operations. When applied to such a device, my invention provides new and novel adjusting means for selecting a desired constant torque.

It is a general object of my invention to provide a new and improved torque device of the magnetic drag type.

It is a more particular object of my invention to provide a new and novel means for adjusting the torque of a magnetic torque device, such as a hysteresis brake, or the like.

It is a still further object of my invention to provide a new and novel resilient spider or web for supporting the magnetizable annulus of a hysteresis torque device.

In a preferred embodiment of my invention applicable to hysteresis torque devices, I mount an annulus of magnetizable material for rotation about its axis, and positioned adjacent the annulus and on opposite sides thereof a pair of fixedly mounted magnets axially spaced from the annulus and disposed diametrically thereacross. The magnets are mounted for relative angular adjustment about their common transverse axis, thereby to vary the torque exerted upon the annulus as it rotates. It will be understood as the description proceeds, however, that my adjustment means contemplates also that the magnets may be radially, or even circumferentially spaced apart, and is equally applicable to eddy current torque devices in which the annulus or rotor is formed of electric conducting material.

My invention will be more fully understood and its various objects and advantages further appreciated by referring now to the following detailed specification taken in conjunction with the accompanying drawing in which Fig. 1 is a side elevational view of a winding reel and constant torque device associated therewith; Fig. 2 is an axial cross sectional view of the constant torque device; and Fig. 3 is an end view of the device with the casing partially broken away to illustrate the internal structure.

Referring now to the drawing, and particularly to Fig. 1, I have there illustrated a spool or reel 1 mounted upon a spindle or shaft 2 and arranged to have wound thereon an elongated filament or thread 3. The shaft 2 carries at its lower end the rotor (see Figs. 2 and 3) of a constant torque device 4 of the hysteresis type, the stator of which is mounted upon a fixed supporting member 5.

Referring now more particularly to Figs. 2 and 3, the constant torque device 4 shown by way of illustration of my invention comprises relatively rotatable rotor and stator members. The rotor member is mounted upon the shaft 2 and comprises a hub 6 fixed to the shaft, a spider or web 7 mounted upon the hub and an annulus or rim 8 of high coercive force magnetizable material mounted upon and encircling the periphery of the spider 7. The spider 7 is formed of a nonmagnetizable material, such as brass, or the like. The magnetizable annulus 8 is preferably formed of a high coercive force magnetizable material, such as that described and claimed in Patents 1,947,274 and 1,968,569 issued February 13, and July 31, 1934, respectively, to William E. Ruder. Such material comprises 6 to 15% aluminum, 12 to 30% nickel, about 5% copper, if desired, and the remainder iron. As illustrated at Fig. 3, the spider 7 is provided with a plurality of spaced-apart peripheral or circumferential grooves 9, thereby to form a plurality of angularly spaced mounting bosses 10. The circular spider 7 is also slotted along a secant, or non-radially, beneath each boss 10, as at 11, thereby to render the spider radially resilient in the region of each boss. While it is preferable that the bosses 10 and slots 11 be equal in number, this is not a necessary condition. The magnetizable ring 8 encircles the spider and is mounted upon the bosses 10. To protect the annulus 8, a circumferential clamping ring or band 12 is provided, and the whole is bolted together by means of radial bolts 13.

The peripheral grooves 9 and the non-radial slots 11 in the spider 7 provide not only for expansion and contraction of the annulus 8 in response to heat generated in operation, but provide also for cooling the entire rotor. To provide further cooling, I provide also a plurality of fan blades 14 fixed to the hub 6, as illustrated at Fig. 2.

The stator of my constant torque device comprises a two-part housing formed of a pair of cup-shaped sections or shells 15, 16 mounted upon the fixed support 5 in opposing and relatively angularly adjustable relation. The housing 15, 16 encloses the rotor 6, 7, 8, and serves to support on oposite sides of the rotor in axial spaced relation a pair of fixedly mounted but relatively adjustable permanent bar magnets 17, 18. The elongated magnets 17, 18 are mounted in the separate sections of the casing in diametrical and fixed axial spaced relation with respect to the rotatable annulus 8. The magnets 17, 18 are provided at their polar ends with axially extending soft iron pole pieces 17a and 18a, respectively. While the magnets 17, 18 may be electromagnets, they are preferably permanent magnets formed of the same high coercive force magnetizable material heretofore described as comprising the annulus 8. The annulus 8 is thus mounted for rotation in a fixed axial air gap between the pole pieces 17a and 18a.

In order to permit relative angular positioning of the stator magents 17, 18 about their common transverse axis, the circular casing sections 15, 16 are adjustably connected together. The cup-shaped casing section 16 is fixedly mounted upon the support 5, as by bolts 19, and the cup-shaped casing section 15 is slotted, as at 20, and bolted through the slots to the casing section 16. The slots 20 permit relative angular adjustment of the casing sections to which the magnets 17, 18 are fixed.

The magnets 17, 18 are fixed in the casing with their poles of opposite polarity in proximate relation, so that the magnetic field of the magnets passes axially through the flux path formed by the annulus 8. When the magnets 17, 18, are in angular coincidence, the flux path through the annulus 8 is axial only and is of minimum length. When the magnets 17, 18 are angularly displaced, the flux path through the annulus 8 is partially circumferential by reason of the displacement of the cooperating unlike magnet poles along the periphery of the annulus. Thus, as the magnets 17, 18 are angularly displaced, the flux path through the annulus 8 becomes longer.

In operation, it will be evident, that the annulus 8 may be rotated between the poles of magnets 17, 18 by pulling upon the thread 3 to unwind the thread from the spool 1. As the annulus 8 is rotated, the magnetization of each section of the annulus is repeatedly reversed by recurrent passage between the two opposite pairs of poles of the magnets. A braking force is thus applied to the rotor by reason of the hysteresis loss resulting from such repeated reversal of magnetization. The amount of this energy loss, and consequently the magnitude of the restraining force, is proportional to the area of the hysteresis loop for the particular material of the annulus 8. The magnitude of the restraining force and the amount of energy loss is also proportional to the angular displacement between the magnets 17, 18 by reason of the fact that, as the magnets are displaced, the flux density is reduced by the greater reluctance of the longer path. The magnitude of the restraining force is thus adjustable, but is fixed for any predetermined angular relationship of the magnets 17, 18.

In summary then, it is evident that the amount of flux through the annulus 8 is a maximum when the magnets 17, 18 are in angular coincidence, so that the hysteresis loss and restraining force are a maximum under this condition. As the magnets are relatively angularly displaced, the flux path between the cooperating unlike magnet poles is increased in length and the flux density through the annulus 8 is proportionately reduced. By thus reducing the flux density in the annulus, the amount of hysteresis loss per revolution, and the consequent restraining force upon the rotor, is proportionately reduced.

It will now be evident to those skilled in the art that my invention contemplates a magnetic torque device with constant air gap and with torque adjusting means comprising axially and radially fixed but relatively angularly adjustable magnets. The invention is thus equally applicable to hysteresis devices and to eddy current devices, and contemplates a rotor, or secondary, of any convenient circular shape, such as toroidal, cylindrical, cup-shaped, or the like. Moreover, it is contemplated that the primary magnets may be positioned so that the flux path through the secondary is axial, radial, or circumferential, so long as such path is variable in circumferential length by angular separation of cooperating magnet poles.

While I have described a preferred embodiment of my invention by way of illustration, many modifications may occur to those skilled in the art and I wish to have it understood that I intend in the appended claim, to cover all such modifications as fall within the true spirit and scope of my invention.

What I claim as new and desire to secure by Letters Patent of the United States is:

In a constant torque device, a rotatable hub, a web of non-magnetizable material fixed to said hub and having a plurality of peripheral grooves forming circumferentially spaced peripheral mounting bosses, said web being slotted non-radially beneath each said boss to render said web radially resilient in the region of each said boss, an annulus of magnetizable material mounted on said bosses, and a magnet fixedly mounted in magnetizing relation with said annulus, whereby said resilient mounting bosses firmly retain said annulus in position as said annulus expands and contracts in response to heat generated by rotation in the field of said magnet.

GARDELL L. BENNETT.

REFERENCES CITED

The following references are of record in the file of this patent:

UNITED STATES PATENTS

| Number | Name | Date |
| --- | --- | --- |
| 912,504 | Steckel | Feb. 6, 1909 |
| 1,903,832 | Nichols | Apr. 18, 1933 |
| 2,068,820 | Sarazin | Jan. 26, 1937 |
| 2,183,404 | Morrill | Dec. 12, 1939 |
| 2,361,239 | Ransom | Oct. 24, 1944 |
| 2,528,271 | Gibbs | Oct. 31, 1950 |

FOREIGN PATENTS

| Number | Country | Date |
| --- | --- | --- |
| 8,570 | Great Britain | of 1905 |
| 139,905 | Great Britain | Dec. 14, 1922 |
| 446,159 | Great Britain | Apr. 22, 1936 |